US012368656B2

(12) United States Patent
Vasas et al.

(10) Patent No.: US 12,368,656 B2
(45) Date of Patent: Jul. 22, 2025

(54) ADAPTIVE EVENT PROCESSING FOR COST-EFFICIENT CEM

(71) Applicant: Telefonaktiebolaget LM Ericsson (publ), Stockholm (SE)

(72) Inventors: Robert Vasas, Budapest (HU); Attila Báder, Paty (HU); Gábor Magyar, Dunaharaszti (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 472 days.

(21) Appl. No.: 18/008,047

(22) PCT Filed: Jun. 11, 2020

(86) PCT No.: PCT/IB2020/055500
§ 371 (c)(1),
(2) Date: Dec. 2, 2022

(87) PCT Pub. No.: WO2021/250448
PCT Pub. Date: Dec. 16, 2021

(65) Prior Publication Data
US 2023/0261954 A1  Aug. 17, 2023

(51) Int. Cl.
*H04L 43/024* (2022.01)
*H04W 24/08* (2009.01)

(52) U.S. Cl.
CPC ............ *H04L 43/024* (2013.01); *H04W 24/08* (2013.01)

(58) Field of Classification Search
CPC .............................. H04L 43/024; H04W 24/08
See application file for complete search history.

(56) References Cited

U.S. PATENT DOCUMENTS 7,600,007 B1   10/2009  Lewis
9,277,431 B1    3/2016  Podolsky
(Continued)

FOREIGN PATENT DOCUMENTS

WO      2005076644 A1    8/2005
WO      2019201435 A1   10/2019
WO   WO-2021186221 A1 *  9/2021  ......... H04L 41/0816

OTHER PUBLICATIONS

Šipuš, D., "Big Data Analytics for Communication Service Providers", 2016 39th International Convention on Information and Communication Technology, Electronics and Microelectronics (MIPRO), May 30, 2016-Jun. 3, 2016, pp. 513-517, IEEE.

*Primary Examiner* — Mandish K Randhawa
(74) *Attorney, Agent, or Firm* — COATS & BENNETT, PLLC

(57) ABSTRACT

The dynamically generation and evaluation of User Activity Records (UARs) is presented herein to determine which UARs to forward for analytics processing, and how much information to include with the forwarded UARs. To that end, UARs are identified as normal, e.g., those UARs satisfy an evaluation condition, e.g., a threshold condition, and or as abnormal, e.g., those UARs that do not satisfy an evaluation condition, e.g., the threshold condition. For those UARS identified as normal, only a small subset of the normal UARs are forwarded for further analysis to reduce the data volume associated with these normal UARs. For those UARs identified as abnormal, enrichment data is appended to the generated UAR to generate a detailed UAR, all which is forwarded for further analysis.

20 Claims, 7 Drawing Sheets

(56) References Cited

U.S. PATENT DOCUMENTS

| | | |
|---|---|---|
| 2014/0040916 A1 | 2/2014 | Balakrishnan |
| 2017/0102988 A1 | 4/2017 | Purushothaman et al. |
| 2019/0287031 A1 | 9/2019 | Mondal et al. |
| 2021/0329479 A1* | 10/2021 | Al-Dulaimi ............. H04L 43/12 |
| 2023/0090169 A1* | 3/2023 | Mitcsenkov ............ H04L 43/08 |
| | | 455/423 |

* cited by examiner

ADAPTIVE EVENT PROCESSING FOR COST-EFFICIENT CEM

TECHNICAL FIELD

The solution presented herein relates generally to performance assessment of telecommunication systems, and more particularly to troubleshooting-specific event processing for telecommunication systems.

BACKGROUND

Subscriber Analytics or Customer Experience Management (CEM) systems (usually part of the Network Management) monitor and analyze service and network quality at a per-subscriber level in mobile networks. CEM systems are used in Network Operation Centers (NOC) and Service Operation Centers (SOC), as well as by Network Optimization Engineering (e.g., Network Performance Management).

In Network Operation Centers of mobile networks, basic network Key Performance Indicators (KPIs) are continuously monitored. The KPIs are based on node and network events and counters, and are aggregated in time and often for node or other dimensions, e.g., device type, service provider, etc., to evaluate the performance of the node and/or network. KPIs can indicate node and/or network failures, but usually are not detailed enough for troubleshooting purposes. Further, KPIS are typically not suitable for identifying end-to-end, subscriber-perceived service quality issues. Instead, such troubleshooting efforts are typically done by investigating more detailed network logs collected from different network nodes and domains.

Some advanced analytics systems are based on collecting and correlating elementary network events, as well as end-to-end service quality metrics, and computing subscriber level end-to-end KPIs based on the available data. These types of solutions are suitable for session-based troubleshooting and analysis of network issues.

Event-based Subscriber Analytics or CEM are also used in SOCs in order to monitor the quality of the wide variety of services used at the network level, as well as to monitor the customer experience on individual per-subscriber level. These tools are widely used in Customer Care and other business scenarios. Such event-based analytics also require real-time collection and correlation of characteristic node and protocol events from different radio and core nodes, probing signaling IFs, and sampling of the user-plane traffic. Besides the data collection and correlation functions, the system relies upon advanced database, rule engine, and big data analytics platforms.

With the introduction of 5G mobile networks, it is expected that mobile networks will serve (and provide quality of service and/or quality of experience for) a larger variety of new service types, as well as serve a much higher number of devices or user equipment (UEs) than with previous network technologies. This will significantly increase the incoming event rate and type to be processed by network analytics systems. As such, there remains a need for improved collection of events data, as well as improved ways to manage the events data for efficient performance analysis.

SUMMARY

The solution presented herein dynamically generates and evaluates the KPIs in User Activity Records (UARs) to determine which UARs to forward for analytics processing, and how much information to include with the forwarded UARs. To that end, the solution presented herein determines which UARs are normal, e.g., which UARs have KPIs that all satisfy a threshold condition, and which UARs are abnormal, e.g., which UARs have at least one KPI that does not satisfy a threshold condition. For those UARS identified as normal, the solution presented herein reduces the data volume associated with these normal UARs by forwarding a small subset of the generated normal UARs for further analysis, e.g., by forwarding 10-20% of the normal UARs. For those UARs identified as abnormal, the solution presented herein appends enrichment data to the generated UAR to generate a detailed UAR (dUAR), and forwards all or a subset of the generated dUARs for further analysis. In so doing, the solution presented herein provides a snapshot of the KPI information for the normally functioning systems/processes/communications, and provides more detailed information for those acting abnormally to enable effective troubleshooting, root cause analysis, and problem solving.

One exemplary embodiment comprises a method of adaptive event processing to evaluate telecommunication sessions. The method comprises, for each telecommunication session, correlating events data collected for the corresponding telecommunication session and storing the correlated events data in memory. The method further comprises generating a User Activity Record (UAR) for a current time window for each of the telecommunication sessions, where each of the generated UARs includes one or more Key Performance Indicators (KPIs) determined responsive to the correlated events data for the corresponding telecommunication session. The method further comprises identifying each UAR as a normal UAR (nUAR) or an abnormal UAR (aUAR) responsive to an evaluation of each UAR. For example, an aUAR may be any UAR that fails to satisfy a threshold condition, is associated with a failure event, is associated with a failure cause code in a corresponding signaling event, etc. The method further comprises appending enrichment data to each aUAR to generate a detailed UAR (dUAR), where the enrichment data comprises the stored correlated events data for the corresponding telecommunication session. The method further comprises generating a subset of UARs for analytics processing for the current time window, where the subset of UARs has fewer UARs than the total number of generated UARs and comprises a first number of dUARs and a second number of nUARs. The method further comprises applying the analytics processing to the generated subset of UARs to evaluate the telecommunication sessions.

One exemplary embodiment comprises a network node configured for adaptive event processing to evaluate telecommunication sessions. The network node comprises an Operations Support System (OSS) comprising a correlation circuit, a User Activity Record (UAR) generation circuit, a UAR subset selection circuit, and an analytics processing circuit. The correlation circuit is configured to, for each telecommunication session, correlate events data collected for the corresponding telecommunication session and store the correlated events data in a memory in the network node. The UAR generation circuit is configured to generate a UAR for a current time window for each of the telecommunication sessions, where each of the generated UARs including one or more Key Performance Indicators (KPIs) determined responsive to the correlated events data for the corresponding telecommunication session. The UAR generation circuit is further configured to identify each UAR as a normal UAR (nUAR) or an abnormal UAR (aUAR) responsive to an evaluation of each generated UAR. For example, the UAR generation circuit may identify any UAR that fails to satisfy a threshold condition, is associated with a failure event, is associated with a failure cause code in a corresponding signaling event, etc., as an aUAR The UAR generation circuit is further configured to append enrichment data to each aUAR to generate a detailed UAR (dUAR) where the enrichment data comprises the stored correlated events data for the corresponding telecommunication session. The a UAR subset selection circuit is configured to generate a subset of UARs for analytics processing for a current time window. The subset of UARs has fewer UARs than the total number of generated UARs and comprises a first number of dUARs and a second number of nUARs. The analytics processing circuit is configured to apply the analytics processing to the generated subset of UARs to evaluate the telecommunication sessions.

One exemplary embodiment comprises a computer program product for controlling a network node configured for adaptive event processing to evaluate telecommunication sessions, the network node comprising an Operations Support System (OSS). The computer program product comprises software instructions which, when run on at least one processing circuit in the network node, causes the network node to, for each telecommunication session, correlate events data collected for the corresponding telecommunication session and store the correlated events data in memory. When run on the at least one processing circuit, the software instructions further cause the network node to generate a User Activity Record (UAR) for a current time window for each of the telecommunication sessions, where each of the generated UARs includes one or more Key Performance Indicators (KPIs) determined responsive to the correlated events data for the corresponding telecommunication session. When run on the at least one processing circuit, the software instructions further cause the network node to identify each UAR as a normal UAR (nUAR) or an abnormal UAR (aUAR) responsive to an evaluation of each UAR. When run on the at least one processing circuit, the software instructions further cause the network node to append enrichment data to each aUAR to generate a detailed UAR (dUAR), where the enrichment data comprises the stored correlated events data for the corresponding telecommunication session. When run on the at least one processing circuit, the software instructions further cause the network node to generate a subset of UARs for analytics processing for the current time window, where the subset of UARs has fewer UARs than the total number of generated UARs and comprises a first number of dUARs and a second number of nUARs. When run on the at least one processing circuit, the software instructions further cause the network node to apply the analytics processing to the generated subset of UARs to evaluate the telecommunication sessions. Some exemplary embodiments comprise a computer-readable medium comprising the computer program product. In some exemplary embodiments, the computer-readable medium comprises a non-transitory computer readable medium.

DETAILED DESCRIPTION

Conventional systems provide UARs with unified granularity without respect to the actual content of the record itself, which is sub-optimal for some use cases. Further, conventional UARs do not provide sufficient event details for detailed troubleshooting, which limits the root-cause analysis capabilities. Adding sufficient details to all UARs would address this problem, but would significantly increase the data volume associated with the UARs. Such a data volume increase is undesirable, especially with the introduction of 5G and the associated increase in services and UEs. At the same time, the data granularity and quantity are typically unnecessarily too high for Network and Service operation aggregated use cases. As such, the conventional solutions tend to provide insufficient information in some cases, too much information in other cases, and generally are not flexible enough for future systems.

The solution presented herein overcomes these problems to provide more flexibility with UAR generation and analysis. More particularly, the solution presented herein evaluates generated UARs to determine which UARs should be forwarded for troubleshooting and/or performance analysis, and whether some of the forwarded UARs should include enrichment data to facilitate troubleshooting efforts. In so doing, the solution presented herein accommodates the ever increasing number of devices, and the corresponding increase in event rates, while improving the overall troubleshooting capabilities of the network.

Figure 1:
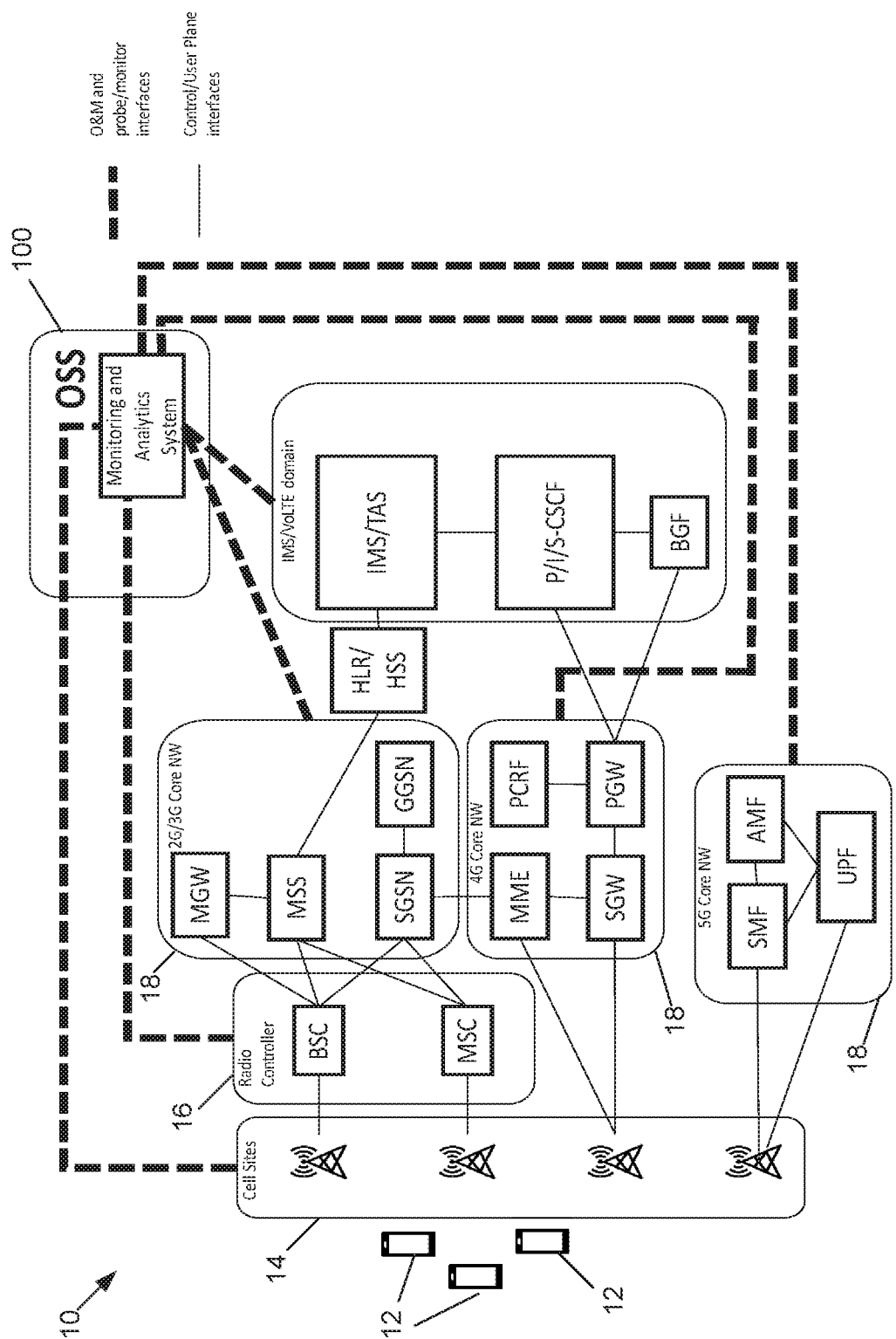
FIG. 1 shows a network diagram for exemplary embodiments of the solution presented herein.

FIG. 1 shows an exemplary telecommunications network 10 applicable to the solution presented herein. While the solution is described in terms of a wireless telecommunications network 10, it will be appreciated that the solution presented herein also applies to wired telecommunications networks. As shown in FIG. 1, Use Equipments (UEs) 12 engage in wireless communications with the network via one or more cell sites 14. Each cell site 14 is generally associated with a particular Radio Access Technology (RAT), e.g., 2G/3G, 4G, 5G, etc., where each RAT is associated with a core node 18 that interfaces either directly or indirectly with the cell sites 14, e.g., via a radio controller 16. Each core node 18 interfaces with an Operations and Support System (OSS) 100, which analyzes and monitors the system performance of the telecommunication sessions for the corresponding RAT according to the solution presented herein.

Figure 2:
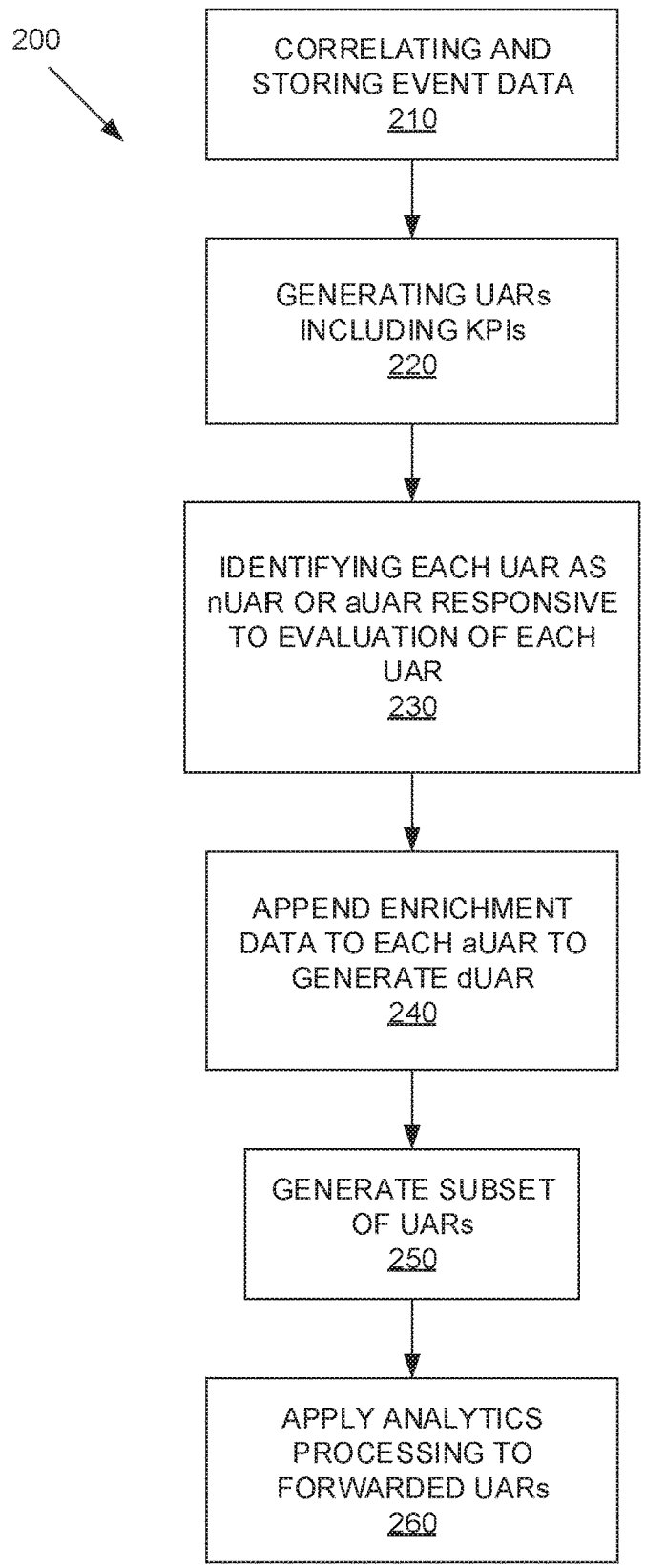
FIG. 2 shows a block diagram for an OSS according to exemplary embodiments of the solution presented herein.
Figure 3:
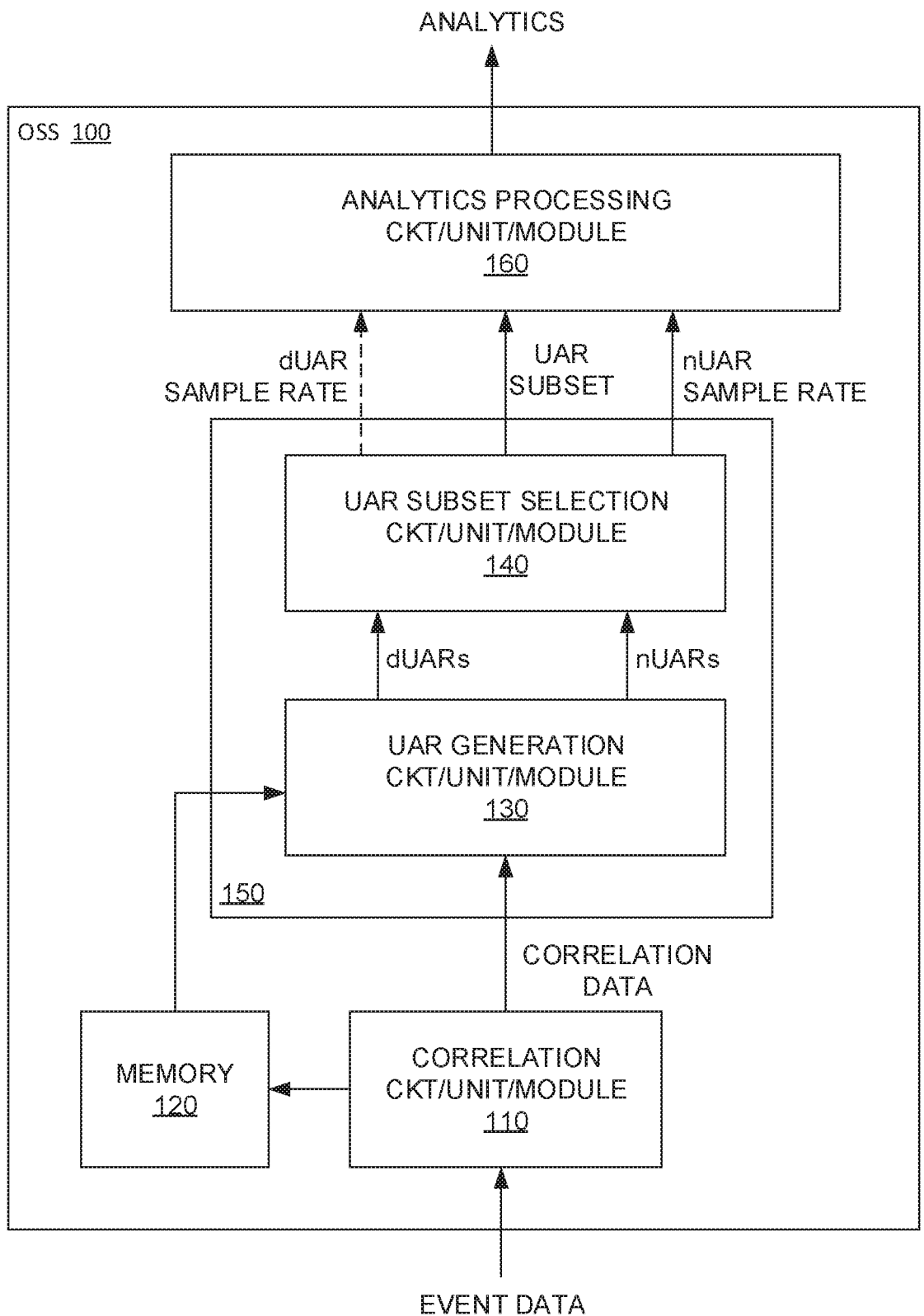
FIG. 3 shows a block diagram for a UAR generation circuit/unit/module according to exemplary embodiments of the solution presented herein.

FIG. 2 shows an exemplary method 200 for adaptive event processing to evaluate telecommunication sessions by an OSS 100, while FIG. 3 shows a block diagram of an exemplary OSS 100 according to the solution presented herein. Before discussing the details of the method 200 of FIG. 2 and the OSS 100 of FIG. 3, the following first generally discusses KPI and UAR determination, as well as general UAR analytics processing for network performance analysis.

A key component for network analysis is the correlation of events and the corresponding Key Performance Indicator (KPI) calculation. For each telecommunication session, events data is produced, which represents the raw data associated with the performance of the telecommunication session. The system correlates the raw events data and calculates KPIs for the telecommunication session from the correlated events data. The results of such event correlation and KPI calculation is a per-session correlated batch record or event report (e.g., End-to-End Session Record), which contains per-subscriber activity and elementary KPIs. Such per-session, per-subscriber reports are referred to herein as User Activity Records (UARs). In addition to the UARs, different aggregation and analytics modules are built for serving the different use cases e.g., Customer Care use cases, Network and Service Operation use cases, Analytics use cases, etc.

Every UAR includes a header block, a KPI block, and a dimensions block. The header block contains general information about the communication session associated with the UAR. For example, the header block may include a subscriber identifier, e.g., an International Mobile Subscriber Identity (IMSI), a device identifier, e.g., an International Mobile Equipment Identity Type Allocation Code (IMEI TAC), a timestamp indicating the start time of the communication session, and a duration of the communication session. The dimension block includes extra information related to the KPIs in the KPI block, where the types of fields in the dimension block depend on the types of KPIs in the KPI block. Exemplary fields for the dimension block include, but are not limited to, fields for a radio cell identifier, service provider, functionality, Access Point Name (APN), gateway node identifiers, Radio Access Technology (RAT), cell type, and carrier. The KPI block includes the calculated KPIs. While the KPI block may include only one KPI, the KPI block typically includes multiple KPIs, where each KPI, e.g., shares the same dimensions, and thus is the same type. For example, when a Transmission Control Protocol (TCP) KPI is calculated, the KPI block may also include a packet loss KPI and a delay KPI because each of these KPIs has the same extra dimensions.

The generated UARs are forwarded to an analytics layer for processing and analysis, where performance assessments for the system are produced responsive to an analysis of the KPIs of each UAR. However, increasing numbers of UEs served by the network and/or the amount of events data processed for each telecommunication session are expected to overload conventional systems, particularly with the introduction of 5G networks. Further, due to limited resources for forwarding and analyzing information, the UARs produced for conventional systems do not provide sufficient details for some analysis and/or troubleshooting operations. The solution presented herein solves these problems by intelligently analyzing generated UARs in real time to determine which UARs should be forwarded for analysis, and which of the UARs to be forwarded should include additional information to facilitate more detailed analysis. In so doing, the solution presented herein reduces the overall volume of the UARs forwarded for analysis without compromising the quality or effectiveness of the subsequent analysis.

FIG. 2 shows an exemplary method 200 for adaptive event processing to evaluate telecommunication sessions by the OSS 100 of FIG. 3. The method 200 comprises, for each telecommunication session, correlating events data collected for the corresponding telecommunication session and storing the correlated events data in memory (block 210). The method 200 further comprises generating a UAR for a current time window for each of the telecommunication sessions, where each of the generated UARs including one or more KPIs determined responsive to the correlated events data for the corresponding telecommunication session (block 220). Subsequently, the method 200 comprises identifying each UAR as a normal UAR (nUAR) or as an abnormal UAR (aUAR) responsive to an evaluation of each UAR (block 230), and appending enrichment data to each aUAR to generate a detailed UAR (dUAR) (block 240). For example, any UAR that fails to satisfy a threshold condition, is associated with a failure event, is associated with a failure cause code in a corresponding signaling event, etc., may each be identified as an aUAR, while all other UARs that pass such an evaluation may each be identified as an nUAR The enrichment data comprises the stored correlated events data for the corresponding telecommunication session, which provides additional detailed information regarding the performance of the corresponding telecommunication session. In exemplary embodiments, this stored events data not only spans the current time window, but also provides correlated events data leading up to the current time window, e.g., +/−30 seconds around the current time window. The method 200 further comprises generating a subset of UARs for analytics processing for the current time window, where the subset of UARs has fewer UARs than the total number of generated UARs and comprises a first number of dUARs and a second number of nUARs (block 250). For example, second number of nUARs may be 10-20% of the total number of normal UARs. In some embodiments, the first number of dUARs may be limited to some maximum number, e.g., 5-10%, of the total number of generated UARs. The method 200 further comprises applying analytics processing to the generated subset of UARs to evaluate the telecommunication sessions (block 260). The solution presented herein thus presents an advanced event processing and correlation method and system, which introduces a near real-time evaluation component of the just-computed KPIs to reduce the number of nUARs forwarded for processing while facilitating more advanced analytics processing for the problematic telecommunication sessions by incorporating enrichment data with those UARs identified as abnormal.

FIG. 3 shows a block diagram of an exemplary OSS 100 for implementing the method 200 of FIG. 2. The OSS 100 may be comprised in a network node within the network 10, and comprises a correlation circuit 110, memory 120, UAR generation circuit 130, UAR subset selection circuit 140, and analytics processing circuit 160. The correlation circuit 110 is configured to, for each telecommunication session, correlate events data collected for the corresponding telecommunication session and store the correlated events data in a memory 120 in the network node. A UAR circuit 150 comprises the UAR generation circuit 130 and the UAR subset selection circuit 140. The UAR generation circuit 130 is configured to generate a UAR for a current time window for each of the telecommunication sessions. Each generated UAR includes one or more KPIs determined responsive to the correlated events data for the corresponding telecommunication session. The UAR generation circuit 130 is further configured to identify each UAR as a normal UAR (nUAR) or as an abnormal UAR (aUAR) responsive to an evaluation of each generated UAR. For example, the UAR generation circuit 130 may identify each UAR that fails to satisfy a threshold condition, is associated with a failure event, is associated with a failure cause code in a corresponding signaling event, etc., as an aUAR, and may identify each UARs that passes such an evaluation as an nUAR The UAR generation circuit 130 appends enrichment data to each aUAR to generate a detailed UAR (dUAR), where the enrichment data comprises the stored correlated events data for the corresponding telecommunication session. The UAR subset selection circuit 140 is configured to generate a subset of UARs for analytics processing for a current time window. The subset of UARs has fewer UARs than the total number of generated UARs and comprising a first number of dUARs and a second number of nUARs, as discussed further below. The analytics processing circuit 160 is configured to apply analytics processing to the generated subset of UARs to evaluate the telecommunication sessions, e.g., via root cause analysis, troubleshooting operations, etc.

The correlation circuit 110 receives events data, e.g., from an events layer of the OSS 100 (see FIG. 8). The events data comprises a wide variety of raw data related to the telecommunication sessions, e.g., radio and core network atomic events, interface probe records for the subscriber and/or control planes, etc. Correlation circuit 110 collects the events data and analyzes the collected events data to compile different types of data. For example, telecommunication systems use various and different identifiers for different telecommunication sub-domains. The correlation circuit 110 resolves and connects the different identifiers together to enable the compilation of different sub-segments of the same type of communications into one unit to generate correlated events data for the various activities associated with a telecommunication session. Such correlated events data is stored in memory 120 and provided to the UAR generation circuit 130 to generate the UARs for a current time window. It will be appreciated that by storing the correlated events data in memory 120, the solution presented herein maintains a record of not only the correlated events data for the current time window, but also of the past correlated events data leading up to the current time window.

The UAR circuit 150 generates a UAR for the current time window for each telecommunication session, and selects which UARs to forward for further analytics processing. Accordingly, the UAR circuit 150 comprises a UAR generation circuit 130 and a UAR subset selection circuit 140. The UAR generation circuit 130 generates a UAR for the current time window for each of the telecommunication sessions. Further, the UAR generation circuit 130 evaluates the generated UARs to determine which are normal UARs (nUARs) and which are abnormal UARs (aUARs), appends enrichment data to the aUARs to generate detailed UARs (dUARs), and forwards the dUARs and nUARs to the UAR subset selection circuit 140. The UAR subset selection circuit generates a UAR subset comprising fewer than the total number of generated UARs from the received dUARs and nUARs.

Figure 4:
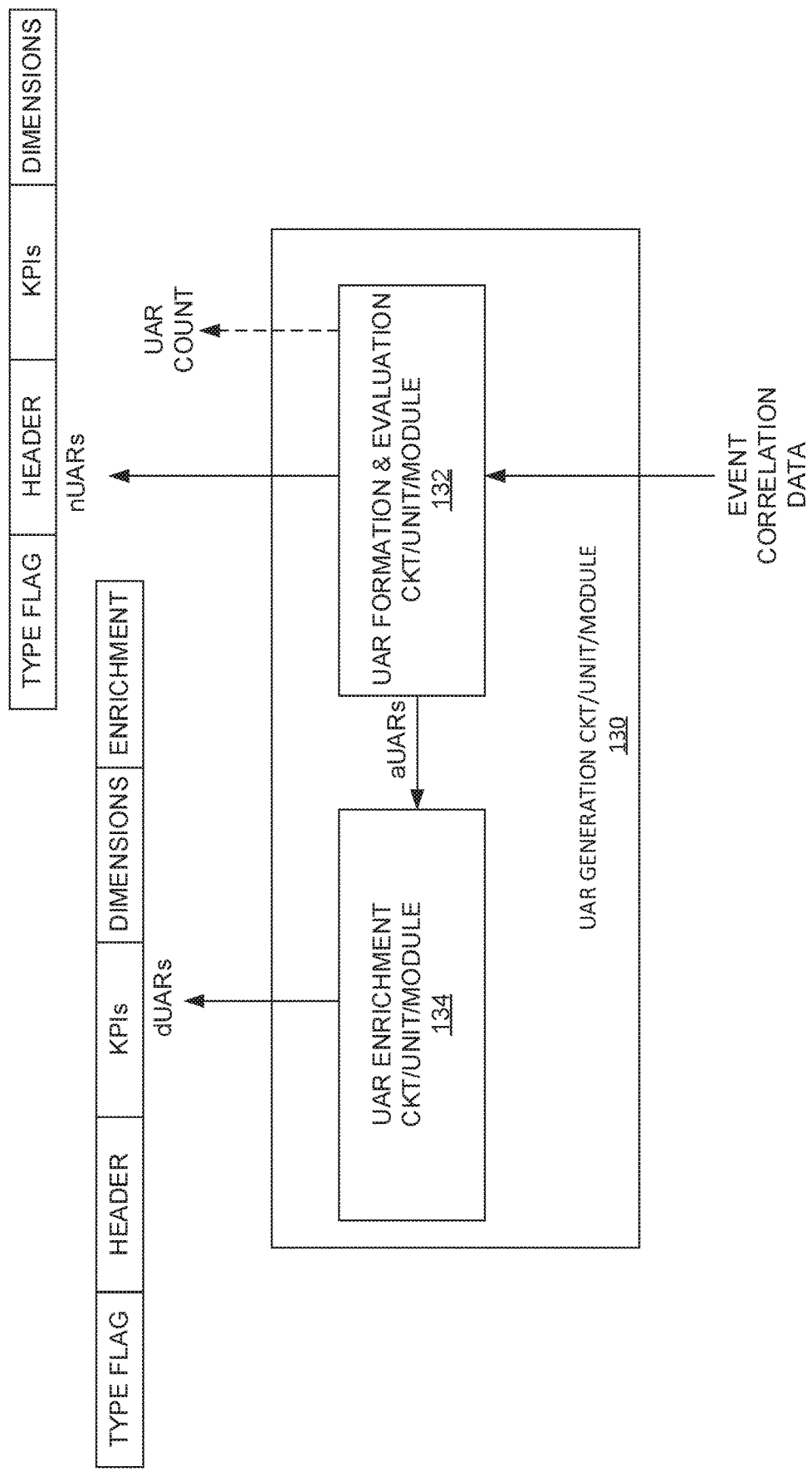
FIG. 4 shows a block diagram for a UAR subset selection circuit/unit/module according to exemplary embodiments of the solution presented herein.

More particularly, The UAR generation circuit 130 generates a UAR for the current time window for each of the telecommunication sessions, where each generated UAR includes one or more KPIs determined responsive to the correlated events data for the corresponding telecommunication session. To that end, the UAR generation circuit 130 comprises a UAR formation and evaluation circuit 132 and a UAR enrichment circuit 134, as shown in FIG. 4. The UAR formation and evaluation circuit 132 generates the UARs (with the KPIs) from the correlated events data, and identifies each UAR as a normal UAR (nUAR) or as an abnormal UAR (aUAR) responsive to an evaluation of each UAR, e.g., relative to at least one threshold condition. More particularly, the UAR formation and evaluation circuit 132 applies a threshold condition, which may be KPI-specific, to each KPI of a generated UAR. If all of the KPIs in a UAR satisfy the corresponding threshold condition(s), the UAR formation and evaluation circuit 132 designates that UAR as normal, e.g., as an nUAR, appends a normal "n" flag on the UAR, and forwards the nUAR for further analytics processing. If, however, one or more of the KPIs in a UAR fails to satisfy the corresponding threshold condition(s), the UAR formation and evaluation circuit 132 designates that UAR as abnormal, e.g., as an aUAR, and forwards the aUAR to the UAR enrichment circuit 134. The UAR enrichment circuit 134 retrieves correlated events data for each aUAR for the telecommunication session, e.g., for the current time window as well as for some amount of time leading up to the current time window (e.g., 30 seconds leading up to the current time window), and appends a detailed "d" flag as well as the retrieved correlated events data as enrichment data to the corresponding aUAR to generate a detailed UAR (dUAR). The UAR enrichment circuit 134 then forwards the dUAR for further analytics processing. It will be appreciated that evaluations other than threshold evaluations may be applied to identify each generated UAR as an aUAR or as an nUAR, e.g., an evaluation of whether the UAR is associated with a failure event, is associated with a failure cause code in a corresponding signaling event, etc.

The threshold condition used to make the normal/abnormal determination may comprise a fixed threshold condition or a dynamic threshold condition. Fixed threshold conditions are, e.g., specified by configuration. For example, a fixed threshold condition may be specified by historical performance data associated with the telecommunication system, desired performance for a particular operating mode and/or subscriber preference, etc. Dynamic threshold conditions may be determined during a configuration phase and/or throughout the operations lifetime of the telecommunications system. While some embodiments may have the UAR formation and evaluation circuit 132 determine the dynamic threshold conditions, in other embodiments a separate threshold circuit (not shown) may be included to determine the dynamic threshold conditions. In either case, the dynamic threshold condition(s) may be determined responsive to a type-specific empirical distribution of the KPI values, e.g., over a threshold time window, where the dynamic threshold condition may be determined whenever there are a significant number of samples in the distribution. For example, by marking a lower quality portion of a distribution as abnormal, a threshold may be dynamically identified for distinguishing KPIs in the lower quality portion of the distribution from the KPIs in the higher quality portion of the distribution. In addition to identifying abnormal UARs, such thresholds may also be useful for controlling the number of UARs designated as abnormal. For example, if the lower 10% of the distribution is designated as the lower quality portion of the distribution, setting the dynamic threshold responsive to this designation not only establishes the threshold, but also controls the number of UARs designated as abnormal to approximately 10% of the total number of generated UARs. It will be appreciated that such a dynamic threshold condition may be regularly updated, or may be transitioned to a fixed threshold at any time.

The dynamic threshold condition(s) may be further enhanced responsive to one or more KPI dimensions associated with the distribution. Various operating conditions, system parameters, etc., may define one or more KPI dimensions, which may be used to enhance the determination of the dynamic threshold condition(s). For example, a drop ratio is generally lower for a 4G RAT than for a 3G RAT. The dynamic threshold condition may account for this extra dimension (i.e., the RAT dimension) by applying a lower threshold for 4G RATs than for 3G RATs, e.g., by setting the threshold condition for a drop ration KPI to 0.01 for 4G RATs and to 0.02 for 3G RATs. In another example, the dynamic threshold condition may account for a terminal type dimension associated with video quality, e.g., where different video quality KPIs (e.g., video Mean Opinion Score (MOS)) depend on a terminal resolution associated with the terminal type. It will be appreciated that the solution presented herein is not limited to these specific KPI dimensions, and that any KPI dimension may be used to further enhance the dynamic threshold condition(s) used by the UAR formation and evaluation circuit 132, including but not limited to, dimensions associated with cell type (e.g., rural, urban, dense, etc.), end user device categories, etc.

Figure 5:
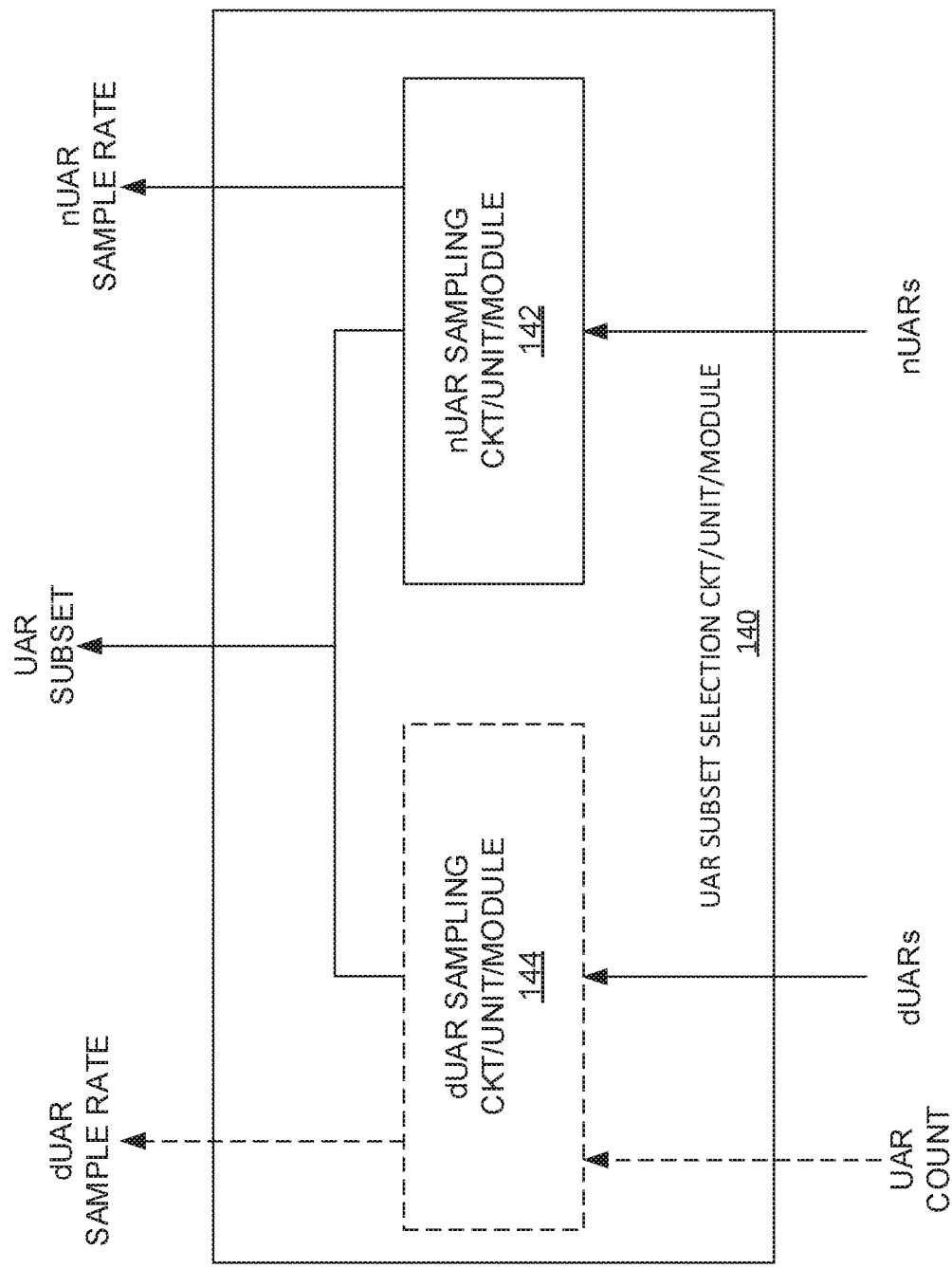
FIG. 5 shows a block diagram for an analytics processing circuit/unit/module according to exemplary embodiments of the solution presented herein.

The UAR generation circuit 130 forwards the dUARs and nUARs to a UAR subset selection circuit 140, which generates a subset of UARs comprising fewer than the total number of generated UARs from the received dUARs and nUARs. FIG. 5 shows a block diagram for an exemplary UAR subset selection circuit 140, which comprises an nUAR sampling circuit 142. The nUAR sampling circuit 142 is configured to select a sampled subset of the nUARs responsive to an nUAR sampling rate. Because the nUARs are normal, they are less critical for troubleshooting purposes. The solution presented herein may therefore sample only a fraction of the nUARs for forwarding, and drop/discard the rest to reduce the load created by increased numbers of served devices and generated UARs without sacrificing the quality or effectiveness of the subsequent analysis. For example, when the nUAR sampling rate is 10%, 90% of the generated UARs designated as normal are dropped, while 10% of the generated UARs designated as normal are forwarded for further analysis.

The nUAR sampling rate may comprise a random sampling rate, where a random sampling parameter is generated and applied as the sampling rate. As such, a random distribution of UARs, and thus a random distribution of subscribers, will be selected for further analysis. Random sampling is the simplest and most cost effective to implement.

The nUAR sampling rate may alternatively comprise a consistent sampling rate. With consistent sampling, the nUARs for the same subscribers are consistently selected. As such, the UARs for those subscribers will stay in the subset of UARs (e.g., for some period of time). Such consistent sampling enables the troubleshooting process to analyze all the records for the selected subscribers in the system, and thus provides an advantage over the random sampling solution, which will naturally not provide 100% of a subscriber's records because of the random sampling. The consistent sampling rate may be determined responsive to any useful distinguishing parameter. For example, in some embodiments the consistent sampling may be determined as a function of the subscriber ID digits, e.g., IMSI. For example, when a 10% sampling rate is desired, the nUAR sampling circuit 142 may choose subscribers with an ID ending with a "0" digit in day 1 (or hour 1, or week 1, depending on time window size), then subscribers with an ID ending with a "1" digit on day 2, . . . , digit "9" on day 10, then restart with digit "0" ending on day 11. It will be appreciated that the subscribers included in the consistently sampled subset may be initially randomly selected, but once selected, each nUAR subset is generated by consistently including the nUARs for the selected subscribers, where the selected subscribers are identified via the corresponding IMSI or any subscriber-specific identifier.

In some exemplary embodiments, the UAR subset generated by the UAR subset selection circuit 140 includes the sampled subset of nUARs output by the nUAR sampling circuit 142 and all of the dUARs received by the UAR subset selection circuit 140. Such embodiments are preferred unless a significant increase in abnormal UARs occurs, in which case an excessive number of UARs would be forwarded for analysis. To address this possibility, the solution presented herein includes an optional dUAR sampling circuit 144 configured to select a (smaller) sampled subset of the dUARs to be included in the UAR subset responsive to a dUAR sampling rate. Such dUAR sampling is based on the total number of dUARs ($C_d$) received by the UAR subset selection circuit 140 and the total UAR count ($C_t$), which number may optionally be provided by, e.g., the UAR formation and evaluation circuit 132. When the number of received dUARs ($C_d$) exceeds a maximum percentage of the UAR count ($C_t$), the dUAR sampling circuit applies the dUAR sampling rate to control how many dUARs are forwarded for further processing, and how many dUARs are dropped. For example, when ($C_d/D_t$)>0.2 (i.e., when more than 20% of the total number of generated UARs are dUARs), the dUAR sampling circuit 144 applies the dUAR sampling rate to achieve the desired maximum number of dUARs in the UAR subset, e.g., 20% of $C_t$.

Figure 6:
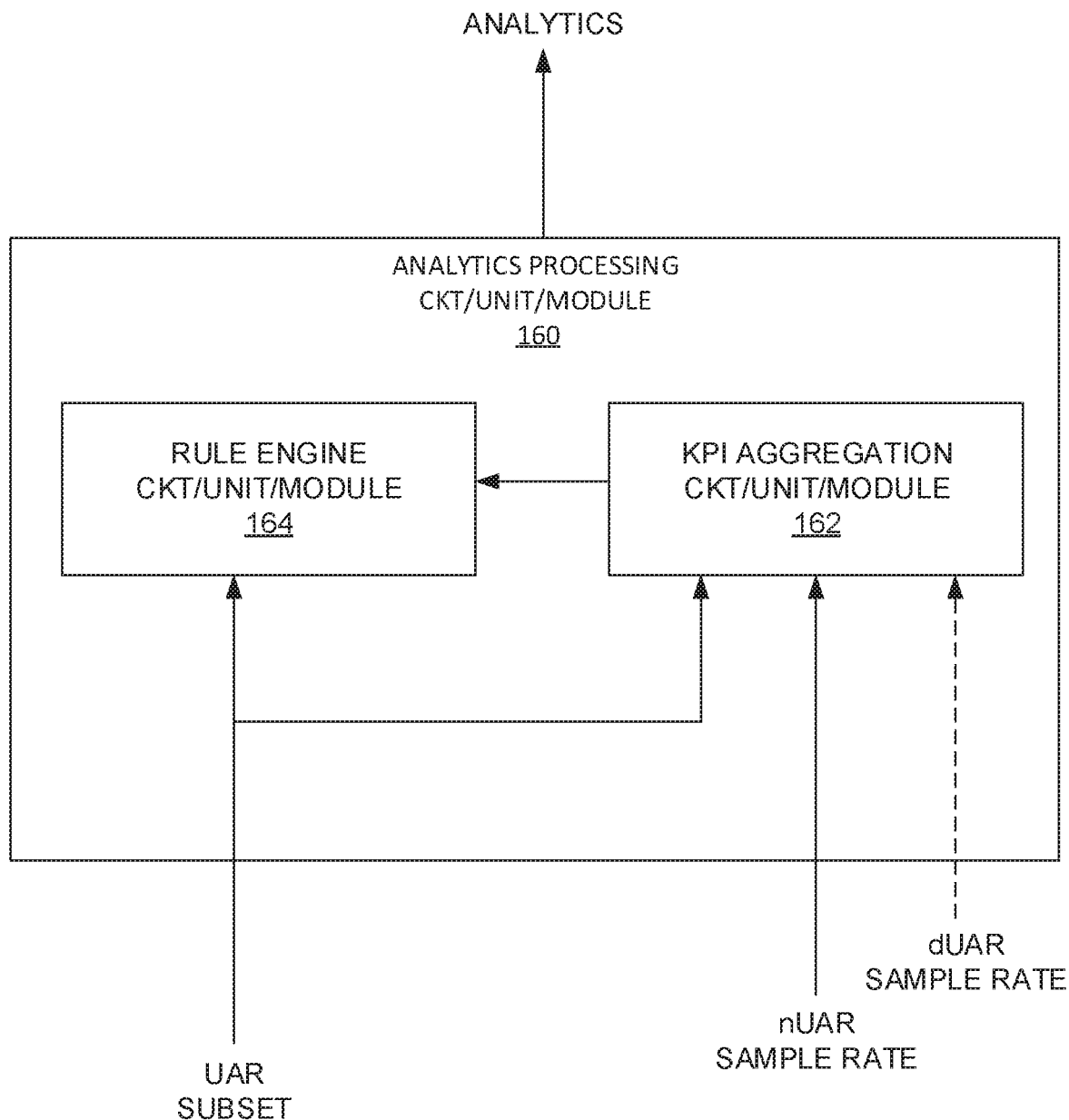
FIG. 6 shows a method of adaptive event processing according to exemplary embodiments of the solution presented herein.

The UAR subset selection circuit 140 forwards the UAR subset and the nUAR sampling rate to the analytics processing circuit 160. When the UAR subset includes a sampled subset of the dUARs, the UAR subset selection circuit 140 also forwards the dUAR sampling rate to the analytics processing circuit 160. FIG. 6 shows a block diagram of an exemplary analytics processing circuit 160, which uses the received nUARs and dUARs to perform analytics processing, as well as troubleshooting and root cause analysis for the telecommunication session.

The analytics processing circuit 160 comprises a KPI aggregation circuit 162 and a rule engine circuit 164. The KPI aggregation circuit 162 aggregates the KPIs from the UARs in the UAR subset. The rule engine circuit 164 analyzes the UARs in the UAR subset to analyze the performance of the associated telecommunication sessions.

In order for the KPI aggregation circuit 162 to fully account for all generated UARs when the analytics processing circuit 160 only receives a subset of the UARs, the KPI aggregation circuit 162 accounts for the dropped nUARs by weighting the number of nUARs ($C_n$) by the reciprocal of the nUAR sampling rate to determine an aggregation number. Similarly, if the UAR subset includes a sampled number of dUARs, the KPI aggregation circuit 162 accounts for the dropped dUARs by weighting the number of dUARs ($C_d$) by the reciprocal of the dUAR sampling rate. In this case, the aggregation number is determined responsive to the weighted number of nUARs and responsive to the weighted number of dUARs. In either case, the KPI aggregation circuit 162 properly maintains the original ratios between the number of nUARs, the number of dUARs, and the total UAR count by aggregating the KPIs from the nUARs and the dUARs in the subset of UARs responsive to the aggregation number. For example, if the UAR subset includes all generated dUARs but only 10% of the generated nUARs, when the KPI aggregation circuit 162 computes the different KPI aggregations, the KPI aggregation circuit 162 considers the number of nUARs with a weight of 1/0.1=10 to ensure that the original ratios between the normal and abnormal KPIs are restored. Similarly, if the UAR subset includes 90% of the generated dUARs and 10% of the generated nUARs, when the KPI aggregation circuit 162 computes the different KPI aggregations, the KPI aggregation circuit 162 considers the number of dUARs with a weight of $1/0.9=1.111$ and considers the number of nUARs with a weight of $1/0.1=10$ to ensure that the original ratios between the normal and abnormal KPIs are restored. This weighting ensures that the nUAR (and dUAR) sampling will not distort the network-level, node-level, terminal-level, etc., aggregates, which maintains the usefulness of the aggregation information to the subsequent processing, e.g., for SOC/NOC use cases.

The rule engine circuit 164 analyzes the information in the UARs of the UAR subset, including the enrichment information presented in each dUAR. More particularly, the rule engine circuit 164 utilizes the enrichment part of each dUAR to assist a detailed root cause analysis process executed by the rule engine circuit 164. For example, the rule engine circuit 164 may implement Root Cause Analysis (RCA) blocks (not shown) to analyze the enrichment information in each dUAR to check for possible causes of the abnormality resulting in the "abnormal UAR" designation. These RCA blocks may, e.g., utilize the existence of event sequences, including their exact timestamps, as part of the root cause analysis.

Figure 7:
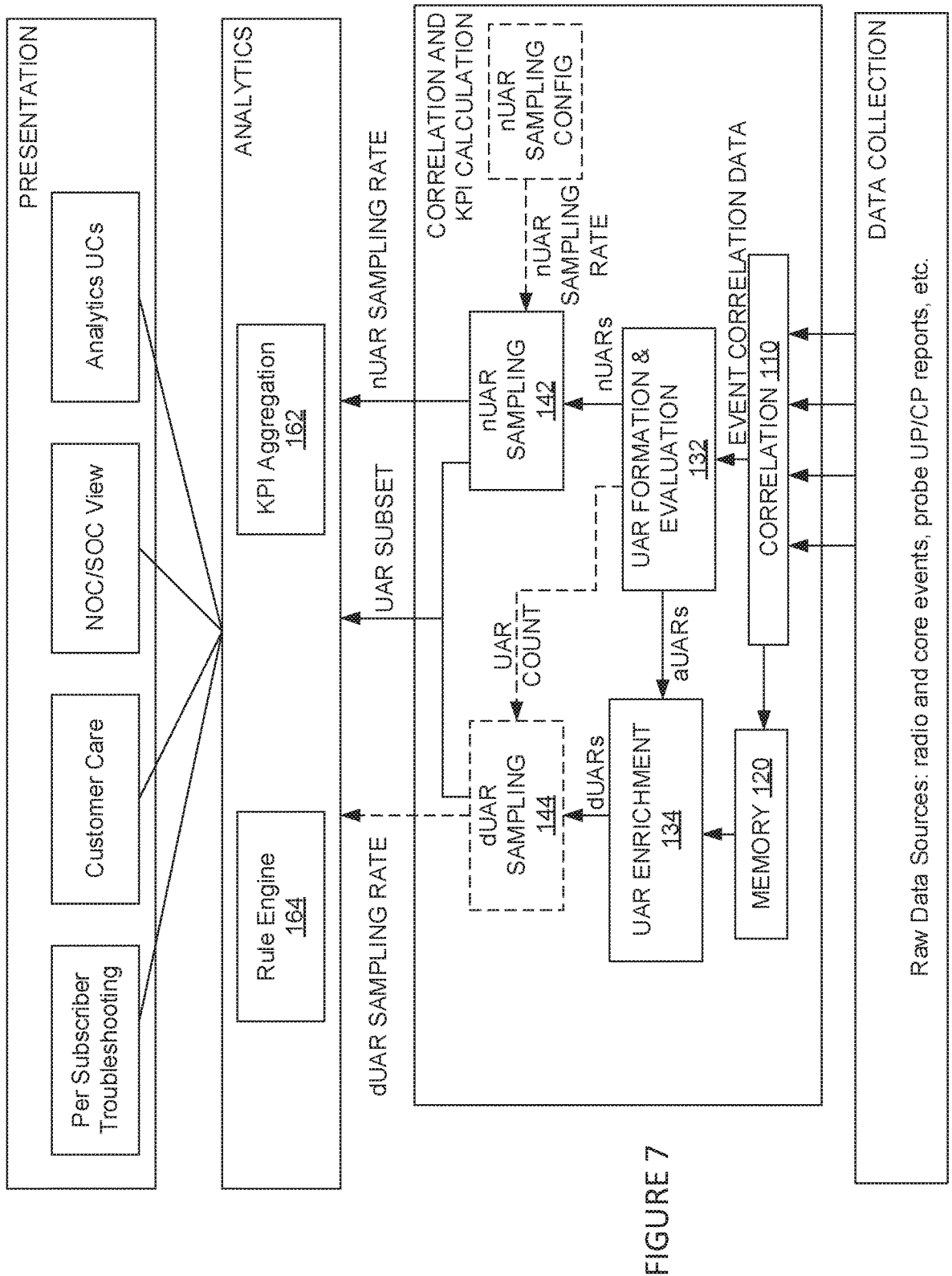
FIG. 7 shows a detailed, layer-specific system according to exemplary embodiments of the solution presented herein.

As noted above, the solution presented herein is implemented by an OSS. In some exemplary embodiments, the various elements of the OSS 100 may be implemented as part of a specific layer of an analytics system. FIG. 7 shows a more detailed architecture for an exemplary embodiment of the solution presented herein, where the analytics system comprises four layers: a data layer, a correlation and KPI calculation layer, an analytics layer and a presentation layer. The collection of various type of raw data occurs in the data layer. Typical raw data sources include, but are not limited to, radio and core network atomic events, Interface Probe records for user plane and control plane traffic, etc. The correlation and KPI calculation layer executes a first analysis of the collected data. In the telecom domain, there are many specific and different identifiers used in the different sub-domains. The task of the correlation part of this layer is to resolve and connect the different identifiers together and thus enable the compilation of different sub-segments of the same communication into one unit. In addition to this end-to-end session formation, the layer also computes KPIs for the activity presented in the session. The analytics layer performs the real analytical tasks and creates the business value from the end-to-end sessions formed from the correlated events and KPIs. Typical functions include, but are not limited to, the aggregation and rule engine functions, implemented by the KPI aggregator and rule engine components, respectively. The rule engine generates so called incidents to atomic sessions if certain (bad) conditions are met (KPI degradation). The rule engine may also perform root-cause analysis, i.e., to provide knowledge regarding why the incident happened. The aggregator forms data cubes along the different available dimensions attached to the KPIs, which enables NOC/SOC use cases, i.e. to enable pinpointing significantly and permanently (or temporarily) bad behaving devices, regions, service providers, etc. The presentation layer conveys the results of the analytics processing, e.g., to the end users of the CEM & Analytics system. The solution presented herein impacts the correlation and KPI calculation layer and the analytics layer (as discussed herein), and does not impact the data collection layer or the presentation layer. While exemplary embodiments of the correlation and KPI calculation layer and the analytics layer are implemented in the OSS 100, it will be appreciated that the solution presented herein does not require all four layers to be implemented in the OSS, or even in a common network node.

The following provides two examples of the solution presented herein. It will be appreciated that these examples are provided for illustrative purposes, and should not be construed as limiting.

In a first example, the UAR is enriched with detailed data for a handover situation. In the normal UAR the Failed x2 handover ratio KPIs are available. Because handover is very complex, there may be several reasons for handover failure, where such failure may occur in several phases of the handover (HO) procedure. Therefore, when a detailed output is triggered (e.g., by an abnormal UAR), the following handover related enrichment data from different data sources are added to generate the dUAR from different data sources:

RRC meas. report before the HO (Source eNodeB)
X2 handover request (Source eNodeB)
UL 51 bearer establishment (S11 (GTP-C) probe)
Admission control result (Target eNodeB)
ERAB setup (Target eNodeB)
RRC resource reservation (Target eNodeB)
X2AP handover ACK (Target eNodeB)
RRC Connection reconfiguration request (Source eNodeB)
RRC Connection reconfiguration complete (Target eNodeB)
MME Modify Bearer request (MME and S11 IF probe)
MME Modify Bearer response (MME and S11 IF probe)
S1 Path Switch Request ACK (MME)
X2AP UE Context Release (Source eNodeB)
RRC measurement report after the HO (Target eNodeB)

The second example illustrates how the detailed UAR may be used to investigate the details of failed sessions in the per-subscriber troubleshooting module, e.g., by checking the sequence diagram and the details of the event in an event browser, success/failure of the of the different phases, cause codes, checking the radio measurements, timing, etc. An automatic function can collect, classify the similar failure cases, and identify the different typical root causes. In the rule engine, conditions may be implemented for the event sequences, cause codes, measurement thresholds, etc., for the identified typical handover issues. In this way, an incident can automatically be generated for the typical handover issues not only indicating the handover, but also the root cause of the handover issue.

The solution presented herein has several advantages over conventional UAR analysis solutions. In the case of UARs with normal KPI values, only a fraction of the generated UARs are forwarded for analysis, e.g., via random or consistent sampling. The KPI values for these normal UARs remain representative of these normal results. As such, the solution presented herein significantly reduces the required analysis associated with normal UARs in the analytics layer without compromising the quality of the analytics use cases. Thus, the solution presented herein significantly reduces the hardware footprint and the total cost of ownership for the overall CEM solution.

In the case of UARs with one or more abnormal KPIs, the detailed UAR will be generated for all, or at least a majority, of the faulty sessions. These detailed UARs enable improved troubleshooting capability for those situations that warrant it, e.g., abnormal operation situations, because the detailed record contains all current correlated events data as well as correlated events data leading up to the detection of the KPI degradation/abnormality, which is a prerequisite for proper root-cause analysis (RCA). Thus, the solution presented herein improves the troubleshooting capabilities of the system without overly burdening the system.

While the solution presented herein is described in terms of various circuits, any functional means, modules, units, and/or circuits may perform the methods, functions, and processing disclosed herein. Thus, the solution presented herein may be implemented by one or more apparatuses. In one embodiment, for example, the apparatuses comprise respective circuits or circuitry configured to perform the steps shown in FIG. 2. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein. Thus, various apparatus elements disclosed herein, e.g., a correlation circuit 110, memory 120, UAR generation circuit 130, UAR subset selection circuit 140, and analytics processing circuit 160, etc., may implement any functional means, modules, units, or circuitry, and may be embodied in hardware and/or in software (including firmware, resident software, microcode, etc.) executed on a controller or processor, including an application specific integrated circuit (ASIC).

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method of adaptive event processing to evaluate telecommunication sessions, the method comprising:
   correlating, for each of the telecommunication sessions, events data collected for the telecommunication session;
   storing the correlated events data in memory;
   generating a User Activity Record (UAR) for a current time window for each of the telecommunication sessions, each of the generated UARs including one or more Key Performance Indicators (KPIs) determined responsive to the correlated events data for the corresponding telecommunication session;
   identifying each UAR as a normal UAR (nUAR) or an abnormal UAR (aUAR) responsive to an evaluation of each UAR;
   appending enrichment data to each aUAR to generate a detailed UAR (dUAR), the enrichment data comprising the stored correlated events data for the corresponding telecommunication session;
   generating a subset of UARs for analytics processing for the current time window, the subset of UARs having fewer UARs than the total number of generated UARs and comprising a first number of dUARs and a second number of nUARs; and
   applying the analytics processing to the generated subset of UARs to evaluate the telecommunication sessions.

2. The method of claim 1, further comprising generating the nUARs and the dUARs in the subset of the UARs, wherein:
   generating the nUARs and the dUARs comprises:
      generating an nUAR for each of the UARs generated for the current time window that satisfies a KPI threshold condition for each KPI in the corresponding UAR, each nUAR comprising a normal flag appended to the corresponding UAR; and
      generating a dUAR for each of the UARs generated for the current time window that does not satisfy the KPI threshold condition for at least one of the KPIs in the corresponding UAR, each dUAR comprising an abnormal flag and the corresponding enrichment data appended to the corresponding UAR; and
   generating the subset of UARs comprises selecting a sampled subset of the nUARs to be included in the subset of UARs for the current time window responsive to an nUAR sampling rate, said sampled subset of nUARs comprising fewer nUARs than the total number of generated nUARs.

3. The method of claim 2, wherein the nUAR sampling rate comprises a random sampling rate configured to select a random distribution of the generated UARs.

4. The method of claim 2, wherein the nUAR sampling rate comprises a consistent sampling rate configured to consistently select the generated UARs associated with a same subset of subscribers.

5. The method of claim 2, wherein applying the analytics processing comprises:
   weighting a number of the nUARs in the sampled subset of nUARs responsive to an inverse of the nUAR sampling rate;
   determining an aggregation number for the UARs responsive to a number of the dUARs in the subset of UARs and responsive to the weighted number of nUARs; and
   aggregating the KPIs from the nUARs and the dUARs in the subset of UARs responsive to the aggregation number.

6. The method of claim 2, wherein generating the subset of UARs further comprises, when a number of the dUARs in the subset of UARs exceeds a predetermined percentage of the total number of UARs in the subset of UARs for the current time window, selecting a sampled subset of the dUARs to be included in the subset of UARs for the current time window responsive to a dUAR sampling rate, the sampled subset of dUARs comprising fewer dUARs than the total number of generated dUARs.

7. The method of claim 6, wherein applying the analytics processing comprises:
   weighting a number of the nUARs in the sampled subset of nUARs responsive to an inverse of the nUAR sampling rate;
   weighting a number of the dUARs in the sampled subset of dUARs responsive to an inverse of the dUAR sampling rate;
   determining an aggregation number for the UARs responsive to the weighted number of dUARs and responsive to the weighted number of nUARs; and
   aggregating the KPIs from the nUARs and the dUARs in the subset of UARs responsive to the aggregation number.

8. The method of claim 1, further comprising determining a threshold condition for each KPI responsive to a distribution of the KPIs during a threshold time window.

9. The method of claim 8, wherein determining the threshold condition for each KPI comprises determining the threshold condition for at least one of the KPIs responsive to a corresponding KPI dimension defining an operating system and/or operating conditions for the corresponding KPI.

10. The method of claim 1, wherein applying the analytics processing to the generated subset of UARs comprises applying the analytics processing to the enrichment data in the dUARs of the subset of UARs to evaluate the corresponding telecommunication sessions.

11. An Operations Support System (OSS) comprising: processing circuitry and a memory, the memory storing instructions executable by the processing circuitry whereby the processing circuitry is configured to:
   correlate, for each of a plurality of telecommunication sessions, events data collected for the telecommunication session; and
   store the correlated events data in the memory;
   generate a User Activity Record (UAR) for a current time window for each of the telecommunication sessions, each of the generated UARs including one or more Key Performance Indicators (KPIs) determined responsive to the correlated events data for the corresponding telecommunication session; and
   identify each UAR as a normal UAR (nUAR) or an abnormal UAR (aUAR) responsive to an evaluation of each generated UAR; and
   append enrichment data to each aUAR to generate a detailed UAR (dUAR), the enrichment data comprising the stored correlated events data for the corresponding telecommunication session;
   generate a subset of UARs for analytics processing for a current time window, the subset of UARs having fewer UARs than the total number of generated UARs and comprising a first number of dUARs and a second number of nUARs; and apply the analytics processing to the generated subset of UARs to evaluate the telecommunication sessions.

12. The OSS of claim 11, wherein the processing circuitry is further configured to select a sampled subset of the nUARs to be included in the subset of UARs for the current time window responsive to an nUAR sampling rate, the sampled subset of nUARs comprising fewer nUARs than the total number of generated nUARs.

13. The OSS of claim 12, wherein the nUAR sampling rate comprises a random sampling rate configured to select a random distribution of the generated UARs.

14. The OSS of claim 12, wherein the nUAR sampling rate comprises a consistent sampling rate configured to consistently select the generated UARs associated with a same subset of subscribers.

15. The OSS of claim 12, wherein to apply the analytics processing the processing circuitry is configured to:
   weight a number of the nUARs in the sampled subset of nUARs responsive to an inverse of the nUAR sampling rate;
   determine an aggregation number for the UARs responsive to a number of the dUARs in the subset of UARs and responsive to the weighted number of nUARs; and
   aggregate the KPIs from the nUARs and the dUARs in the subset of UARs responsive to the aggregation number.

16. The OSS of claim 12, wherein the processing circuitry is further configured to, when a number of the dUARs in the subset of UARs exceeds a predetermined percentage of the total number of UARs in the subset of UARs for the current time window, select a sampled subset of the dUARs to be included in the subset of UARs for the current time window responsive to a dUAR sampling rate, said sampled subset of dUARs comprising fewer dUARs than the total number of generated dUARs.

17. The OSS of claim 16, wherein to apply the analytics processing the processing circuitry is configured to:
   weight a number of the nUARs in the sampled subset of nUARs responsive to an inverse of the nUAR sampling rate;
   weight a number of the dUARs in the sampled subset of dUARs responsive to an inverse of the dUAR sampling rate;
   determine an aggregation number for the UARs responsive to the weighted number of dUARs and responsive to the weighted number of nUARs; and
   aggregate the KPIs from the nUARs and the dUARs in the subset of UARs responsive to the aggregation number.

18. The OSS of claim 11, wherein the processing circuitry is further configured to determine a threshold condition for each KPI responsive to a distribution of the KPIs during a threshold time window.

19. The OSS of claim 18, wherein to determine the threshold condition for each KPI the processing circuitry is configured to determine the threshold condition for at least one of the KPIs responsive to a corresponding KPI dimension defining an operating system and/or operating conditions for the corresponding KPI.

20. The OSS of claim 11, wherein to apply the analytics processing to the generated subset of UARs the processing circuitry is configured to apply the analytics processing to the enrichment data in the dUARs of the subset of UARs to evaluate the corresponding telecommunication sessions.

* * * * *